United States Patent [19]

Phillips

[11] 3,825,682

[45] July 23, 1974

[54] BALANCED LINE DRIVER, LINE RECEIVER SYSTEM

[75] Inventor: Paul Creighton Phillips, Medford Lakes, N.J.

[73] Assignee: RCA Corporation, Princeton, N.J.

[22] Filed: June 27, 1973

[21] Appl. No.: 374,139

[52] U.S. Cl. ........................... 178/69 G, 340/253 R

[51] Int. Cl. ........................................... H04l 11/08

[58] Field of Search..... 178/69 G, 70 R; 340/253 R, 340/253 B, 253 C, 253 N, 411; 179/175.2 C

[56] References Cited

UNITED STATES PATENTS

| | | | |
|---|---|---|---|
| 2,997,700 | 8/1961 | Kramer | 340/253 C |
| 3,381,090 | 4/1968 | Dorrell et al. | 178/70 R |
| 3,466,643 | 9/1969 | Moorefield | 340/253 R |
| 3,622,709 | 11/1971 | Tjaden | 179/175.2 C |
| 3,770,912 | 11/1973 | Alford | 340/253 R |

*Primary Examiner*—Thomas A. Robinson
*Attorney, Agent, or Firm*—H. Christoffersen; Samuel Cohen

[57] ABSTRACT

The problem dealt with here is that of preventing erratic behavior of a line receiver when an open occurs in the balanced transmission line feeding the receiver, or when the power supply for the line driver goes off. In the present circuit, bias currents are applied to the transmission line in such a way that the potentials due to these currents are the same on both conductors of the line. A resistor network, responsive to the interruption in bias current flow through one or both conductors or to a change in the path taken by such current flow, places the input circuit of the receiver at a voltage indicative of a given binary value.

6 Claims, 2 Drawing Figures

BALANCED LINE DRIVER, LINE RECEIVER SYSTEM

STATEMENT

The invention herein described was made in the course of or under a contract with the Department of the Army.

Figure 1:
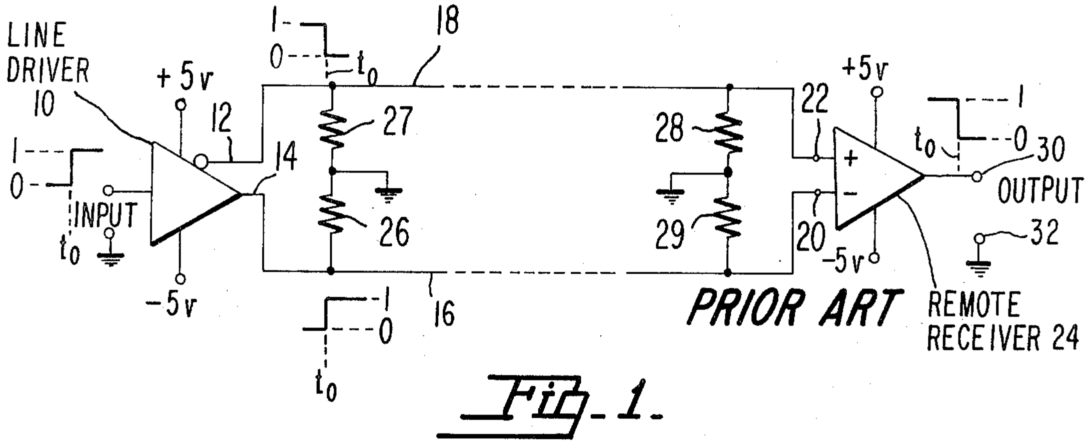

FIG. 1 shows a typical line driver, line receiver circuit. The line driver 10, which is known as a differential line driver, has an inverting output terminal 12 and a noninverting output terminal 14, these terminals being connected to one end of a balanced transmission line 16, 18. The transmission line connects to the input terminals 20 and 22 of a differential line receiver 24, that is, a receiver which produces an output signal of one binary value when the two input signals differ in one sense and which produces an output signal of the other binary value when the two input signals differ in the opposite sense. Each conductor is terminated at each end by a resistor connected to a point of reference potential, such as ground. These resistors 26, 27, 28 and 29, respectively, are all of the same value, which may be 51 ohms, as an example. Typically, the terminating resistors have values such that the line is terminated at both ends in its characteristic impedance.

In the operation of the system of FIG. 1, when the input signal goes high, as shown, the signal at line driver output terminal 12 goes low and that at output terminal 14 goes high. It is arbitrarily assumed, for purposes of the present discussion, that a high represents the binary digit (bit) 1 and a low represents the bit 0. These signals are transmitted via the transmission line 16, 18 to the input terminals 20, 22 of the line receiver 24. When a 1 is present at the noninverting terminal 22 of the receiver and a 0 is present at the inverting terminal 20 of the receiver, a 1 appears at the output terminals 30, 32 of the receiver.

In one particular design employing transistor-transistor logic ($T^2L$), any time that terminal 22 is 50 millivolts more positive than terminal 20, the receiver produces an output indicative of a 1 and when the reverse condition exists, the receiver produces an output indicative of a 0. In normal operation, there is always a sufficient difference in voltage between lines 16 and 18 so that the remote receiver always produces an output representing one of the binary values.

A potential problem exists in the system of FIG. 1 when, as sometimes occurs, one or both of the lines 16 and 18 develops an open, or when the power supply for the line driver goes off, either accidentally or by design. In any of these situations, the input terminals 20, 22 of the remote receiver both may be placed at ground potential through resistors 28 and 29. Ground is an undefined condition for the line receiver, that is, it represents neither a 1 nor a 0. Accordingly, the state the receiver will assume is indeterminate. In practice, what sometimes occurs is that noise which may be present causes a voltage to develop across the input terminals 22, 20, which voltage rapidly changes between values representing 1 and 0, and this causes the receiver output signal to switch rapidly between the 1 and 0 levels. While in some uses for the system of FIG. 1 this rapid switching between levels may not be troublesome, in others, such as where the signal is being employed to control power handling equipment, the results can be catastrophic.

Figure 2:
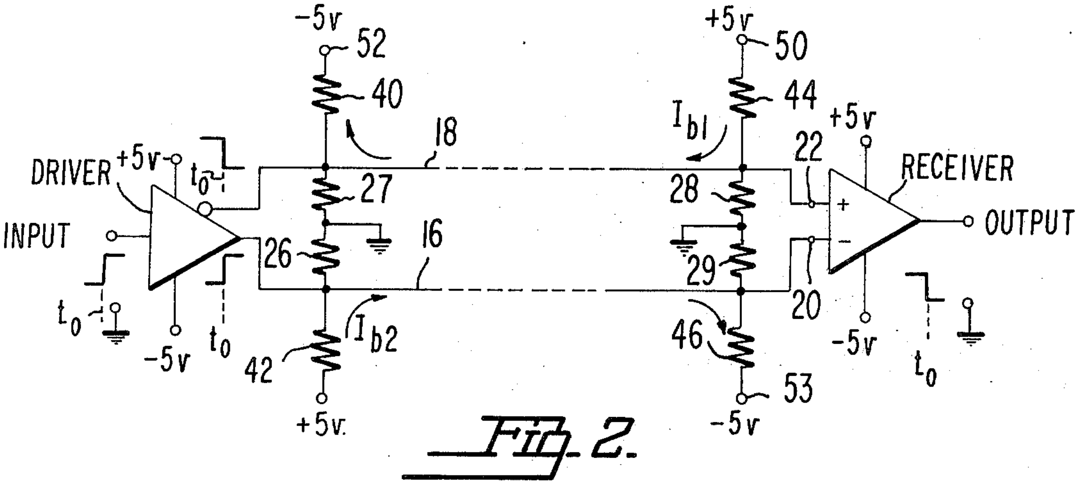

The invention is illustrated in the drawing of which:

FIG. 1 is a block and schematic diagram of a known circuit already discussed; and FIG. 2 is a block and circuit diagram of a preferred embodiment of the present invention.

The circuit of FIG. 2 includes all of the elements of FIG. 1. In addition, a resistor 40 is connected between the −5 volts line driver power supply terminal and the input end of line 18; a second resistor 42 is connected between the +5 volt line driver power supply terminal and the input end of line 16; a third resistor 44 is connected between the +5 volt line receiver power supply terminal and the output end of line 18; and a resistor 46 is connected between the −5 volt line receiver power supply terminal and the output end of line 16. The resistors 40, 42, 44 and 46 preferably are all of the same value.

In operation, the circuit just described produces biasing currents which, in normal operation, continously are present. The biasing current $I_{b1}$ flows in one direction through line 18 and the biasing current $I_{b2}$ flows in the opposite direction through line 16. These currents are of equal value. As resistor 40 is equal in value to resistor 44 and as the voltage applied to terminal 50 is equal but of opposite polarity to the voltage applied to terminal 52, the potential on line 18 due to the bias currents is zero volts or ground. Similarly, the potential on line 16 due to the biasing currents is ground. As the terminating resistors 26–29 are also connected to ground, no biasing current flows through these terminating resistors. The network, however, does not interfere with the signals applied to the line by the driver 10. With respect to these signals, the circuit operates exactly as the FIG. 1 circuit. The line is terminated at both ends in substantially its characteristic impedance for these signals.

If now either one or both of the lines becomes open, the input terminals 22, 20 become established at fixed direct voltage levels indicative of one of the binary values (binary 1 in this example). For example, if both lines 16 and 18 should be open, current flows through the resistor network 44, 28, 29, 46 and a relatively positive voltage develops at terminal 22, and a relatively negative voltage at terminal 20. The values of resistors 44 and 46 are chosen to insure that the potential difference is substantially greater than 50 millivolts.

The circuit also operates just as well when only one of the lines is open. For example, if line 18 should open, current flows from terminal 50 through resistors 44 and 28 to ground. This causes a positive voltage to develop at terminal 22. Terminal 20 remains at ground, but the resistor values are so chosen that the difference in voltage between terminals 20 and 22 is substantially greater than 50 millivolts.

In the event that the power supply at the line driver fails or is intentionally turned off, the circuit of FIG. 2 also will clamp the input terminals of the receiver at a voltage indicative of a 1. When the power supply at the driver is off, the input end of the line 16, 18 sees ground via resistors 26 and 27. Note that the resistors 42, 40 receive their voltage from the same power supply as the line driver 10 so that when this power supply goes off, the bias voltages also go off. Note also that the receiver power supply, which also supplies bias current to resistors 44 and 46, is separate from and independent of the line driver power supply and may be at an entirely different location than and many miles from the driver and its power supply. The bias current $I_{b1}$ flows through the resistor 44 and through the parallel path which includes resistors 27 and 28 and possibly other current paths within the driver 10. This causes a positive voltage to develop at terminal 22. In similar fashion, current flows through the parallel resistors 26 and 29 and through resistor 46 to the −5 volt terminal 53 causing a negative voltage to develop at terminal 20. The difference in potential between terminals 22 and 20 represents a 1.

While the convention has been adopted for purposes of the present explanation that in response to an open line or other reason for change in the path taken by a bias current, the line receiver input terminals are placed at a difference in voltage representing a 1, it is to be understood that the biasing instead can be such as to place the input terminal at a difference in voltage representing a 0. Biasing in this way may be achieved by changing the polarities of all of the voltages applied to the biasing resistors 40, 42, 44 and 46.

In one particular design, the value chosen for resistors 26–29 was 51 ohms each, and the value chosen for resistors 40–46 was 1470 ohms each. It is to be understood that this is an example only, the specific values selected in any case depending upon various operating parameters including the line impedance, the power supply voltages, the threshold level of the receiver and so on.

While it is mentioned, by way of example, that the line receiver and line driver may employ $T^2L$ circuits, it is to be understood that invention is not limited to the use of such circuits. It is applicable to many direct coupled line driver, line receiver combinations.

What is claimed is:

1. In combination:

a differential line driver having a pair of output terminals;

a differential line receiver having a pair of input terminals;

a two conductor transmission line connecting the output terminals of said line driver to the input terminals of said line receiver;

means for quiescently establishing a continuous flow of bias current through each conductor while maintaining both conductors at substantially the same bias potential; and means responsive to a change in the path taken by either bias current, for establishing a difference in potential between said input terminals of said line receiver of a given sense and of greater than a given amplitude.

2. In the combination as set forth in claim 1, said means for establishing a continuous flow of bias current comprising means for applying a current to one end of one of the conductors and withdrawing that current from the other end of said one conductor and means for applying a current of the same value to one end of the other of said conductors and withdrawing it from the opposite end of said other conductors, said two currents being applied to flow in opposite directions through said two conductors.

3. In the combination as set forth in claim 1, said means responsive to a change in the path taken by either bias current, comprising load means connecting the end of said two conductors at said input terminals of said receiver to a point of reference potential.

4. In combination:

a differential line driver having a pair of output terminals;

a differential line receiver having a pair of input terminals;

a two conductor transmission line connecting the output terminals of said line driver to the input terminals of said line receiver;

means for quiescently establishing a continuous flow of bias current through each conductor while maintaining both conductors at substantially the same bias potential;

a pair of current paths, one connected between the receiver end of one conductor and a point at said bias potential and the other connected between the receiver end of the other conductor and said point at said bias potential, whereby if either conductor opens, bias current formerly flowing through that conductor flows instead through the current path connected to the receiver end of that conductor; and means responsive to a flow of bias current through one or both of said paths for establishing a difference in potential between said input terminals of said line receiver of a given sense and of greater than a given amplitude.

5. In the combination as set forth in claim 4, said means for establishing a continuous flow of bias current comprising a current source connected to the driver end of one conductor and a current sink connected to the driver end of the other conductor, and a current sink connected to the receiver end of said one conductor and a current source connected to the receiver end of said other conductor, whereby if one or both of said current source and current sink at the receiver end of said two conductors should turn off, bias current would flow through one or both of said paths.

6. In the combination as set forth in claim 5, said means responsive to a flow of bias current comprising resistive means in each path.

* * * * *